US008595236B2

(12) United States Patent
Jain et al.

(10) Patent No.: US 8,595,236 B2
(45) Date of Patent: Nov. 26, 2013

(54) SEARCHING EXISTING USER INTERFACES TO ENABLE DESIGN, DEVELOPMENT AND PROVISIONING OF USER INTERFACES

(75) Inventors: Anshu N. Jain, Bengaluru (IN); Senthil Mani, Gurgaon (IN); Vibha S. Sinha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 12/613,179

(22) Filed: Nov. 5, 2009

(65) Prior Publication Data

US 2011/0107243 A1 May 5, 2011

(51) Int. Cl.
G06F 7/00 (2006.01)
G06F 3/048 (2013.01)
G10L 15/00 (2013.01)

(52) U.S. Cl.
USPC .............................. 707/741; 704/257; 715/810

(58) Field of Classification Search
None
See application file for complete search history.

(56) References Cited

U.S. PATENT DOCUMENTS

| 5,781,720 | A * | 7/1998 | Parker et al. ............... 714/38.11 |
| 6,867,789 | B1 | 3/2005 | Allen et al. |
| 7,058,890 | B2 * | 6/2006 | George et al. ................. 715/728 |
| 7,349,893 | B2 | 3/2008 | McKeon |
| 7,464,367 | B2 | 12/2008 | Wain et al. |
| 2004/0111728 | A1* | 6/2004 | Schwalm ...................... 719/316 |
| 2005/0193380 | A1* | 9/2005 | Vitanov et al. ................ 717/143 |
| 2006/0265661 | A1 | 11/2006 | Ball |
| 2006/0291714 | A1* | 12/2006 | Wu et al. ........................ 382/149 |
| 2007/0130205 | A1 | 6/2007 | Dengler et al. |
| 2007/0150805 | A1 | 6/2007 | Misovski |
| 2007/0220035 | A1 | 9/2007 | Misovski |
| 2008/0040315 | A1 | 2/2008 | Auerbach et al. |
| 2008/0275910 | A1 | 11/2008 | Molina-Moreno et al. |
| 2008/0276218 | A1 | 11/2008 | Taylor et al. |
| 2008/0282142 | A1 | 11/2008 | Butlin et al. |
| 2008/0301628 | A1 | 12/2008 | Lochmann |
| 2009/0006992 | A1 | 1/2009 | Gilboa |
| 2009/0031230 | A1* | 1/2009 | Kesler ........................... 715/764 |
| 2010/0114851 | A1* | 5/2010 | Wernecke ..................... 707/705 |
| 2010/0318974 | A1* | 12/2010 | Hrastnik et al. .............. 717/135 |

OTHER PUBLICATIONS

Tim Lloyd et al, "Intercative Books Final Report", May 2, 2003.*
Pinheiro da Silva. User Interface Declarative Models and Development Environments: A Survey http://www.ksl.stanford.edu/people/pp/papers/PinheirodaSilva_DSVIS_2000.pdf, downloaded May 12, 2010.
Molina et al. JUST-UI: A User Interface Specification Model http://www.dsic.upv.es/~west/TIMIU%2702/ficheros/Molina-CADUI2002.pdf, downloaded May 12, 2010.
Deng et al. Managing UI pattern collections, CHINZ'05, Jul. 6-8, 2005, pp. 31-38.

(Continued)

Primary Examiner — Tarek Chbouki
(74) Attorney, Agent, or Firm — Ryan, Mason & Lewis, LLP

(57) ABSTRACT

Techniques for searching for a user interface (UI) are provided. The techniques include receiving a desired user interface as a query, determining meta-data for the desired user interface, wherein determining the meta-data for the desired user interface comprises converting the desired user interface query to a meta-data query, and using the meta-data query to search for the desired user interface, wherein searching for the desired user interface comprises querying meta-data of one or more existing user interfaces and selecting one or more similar user interfaces.

17 Claims, 4 Drawing Sheets

(56) References Cited

OTHER PUBLICATIONS

Snásel, V. GUI Patterns and Web Semantics, 6th International Conference on Computer Information Systems and Industrial Management Applications (CISIM'07), pp. 1-6.

Baba et al. Similarity-based Partial Image Retrieval System for Engineering Drawings, proceedings of the Seventh IEEE International Symposium of Multimedia (ISM'05), pp. 1-7.

Pu et al. On visual similarity based 2D drawing retrieval, Computer-Aided Design 38 (2006) pp. 249-259.

GUI Builders Commercial and Free http://en.wikipedia.org/wiki/Graphical_user_interface_builder, downloaded May 12, 2010.

User Interface Technologies http://en.wikipedia.org/wiki/Widget_toolkit, downloaded May 12, 2010.

* cited by examiner

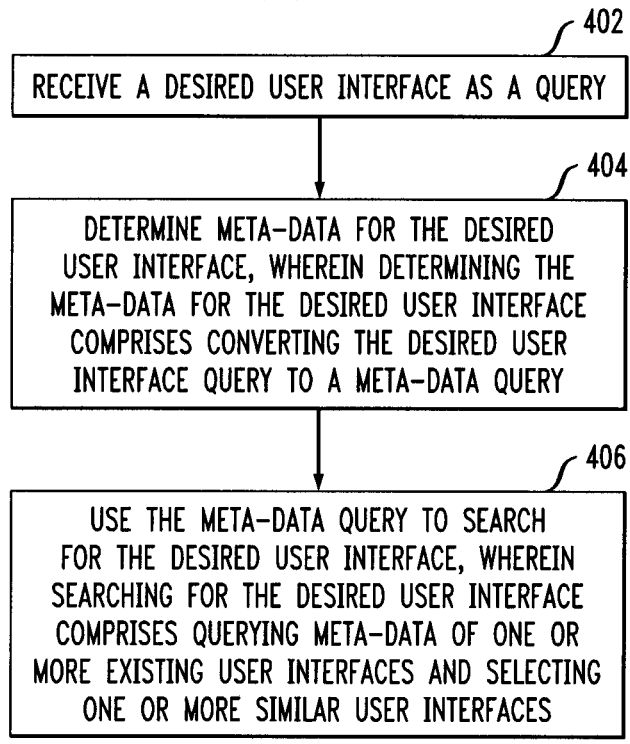
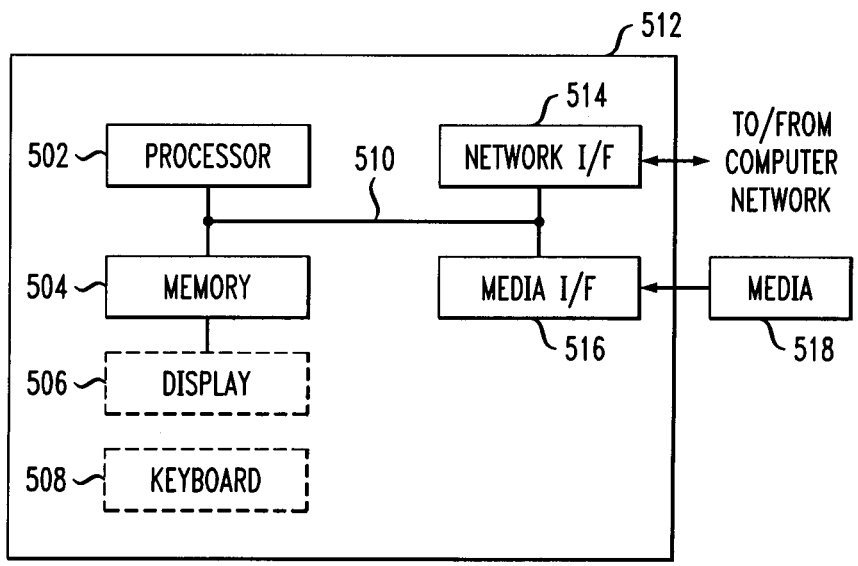

SEARCHING EXISTING USER INTERFACES TO ENABLE DESIGN, DEVELOPMENT AND PROVISIONING OF USER INTERFACES

FIELD OF THE INVENTION

Embodiments of the invention generally relate to information technology, and, more particularly, to user interfaces.

BACKGROUND OF THE INVENTION

Software with a graphical user interfaces (GUIs) often contain many different user interfaces (UIs) that differ from each other based on various qualitative aspects.

Such aspects can include, for instance, low-level controls that make up the interfaces (for example, button, text box, combo box, etc.), layout of controls (for example, grid layout, free form layout, etc.), position of individual controls (for example, button on top, button on bottom, etc.), labels associated with controls (for example, 'Click', 'Press', 'Submit', 'Go' on a button), look and feel of controls (colors, borders, transparency, themes, etc.), behavior of controls (read only, clickable, trigger asynchronous request, etc.), content of controls (for example, all labels with "Name" in them, or all dropdowns for geography selection).

Given the various functional requirements, user interface designers can often spend time designing interfaces trying to achieve the right combination of the above qualitative parameters, which impact the overall interface. The process is highly iterative because designers have to attempt many kinds of interfaces until an interface is discovered that best suits the interest of clients. Additionally, given a set of requirements for the above parameters, the designers may end up redesigning an interface which already exists somewhere else in the larger software system or collection of software systems.

As such, challenges include, for example, within the realm of the interne, where a lot of UI designers spend considerable effort designing a web page, similar pages have already been designed and exist in other websites.

SUMMARY OF THE INVENTION

Principles and embodiments of the invention provide techniques for enabling design, development and provisioning of user interfaces. An exemplary method (which may be computer-implemented) for searching for a user interface (UI), according to one aspect of the invention, can include steps of receiving a desired user interface as a query, determining meta-data for the desired user interface, wherein determining the meta-data for the desired user interface comprises converting the desired user interface query to a meta-data query, and using the meta-data query to search for the desired user interface, wherein searching for the desired user interface comprises querying meta-data of one or more existing user interfaces and selecting one or more similar user interfaces.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 4 is a flow diagram illustrating techniques for searching for a user interface (UI), according to an embodiment of the invention; and FIG. 5 is a system diagram of an exemplary computer system on which at least one embodiment of the invention can be implemented.

DETAILED DESCRIPTION

Principles of the invention include indexing and querying user interfaces (UIs). One or more embodiments of the invention include indexing user interfaces based on searchable metadata, and allowing users and/or clients to search for desired interfaces based on the querying the metadata. Additionally, the techniques described herein can include a mechanism of querying for user interfaces similar to a desired user interface by choosing and/or creating the desired user interface graphically on a graphical editor.

As detailed herein, one or more embodiments of the invention include using metadata of user interfaces to index the user interfaces such that similar interfaces can be searched from a large collection of existing user interfaces. Such a step can be performed, for example, by a user interface index engine, which indexes various metadata attributes of the user interface. Also, the techniques described herein can include specifying the query for the desired user interface as another user interface that can be constructed (for example, by a user) using a graphical user interface editor or chosen from an existing list of user interfaces. Such a step can be performed by a user interface query translator, which converts a graphical user interface selected/created by users to a metadata query which can be then executed on the index to return a set of similar user interfaces.

Further, unlike the disadvantageous existing approaches, one or more embodiments of the invention include indexing existing user interfaces based on the qualitative description (that is, meta-data or specification) and using this index to query for user interfaces based on the required metadata or specification.

As detailed herein, user interfaces include user interface elements (such as text input, text area, etc.) and their layout, content that is rendered using these elements and interaction points (such as back-end events or java scripts, etc). The meta-data of an entire user interface can, in turn, include capturing the meta-data around these dimensions. In one or more embodiments of the invention, a repository of such meta-data (extracted from various user interfaces) is created.

Figure 1:
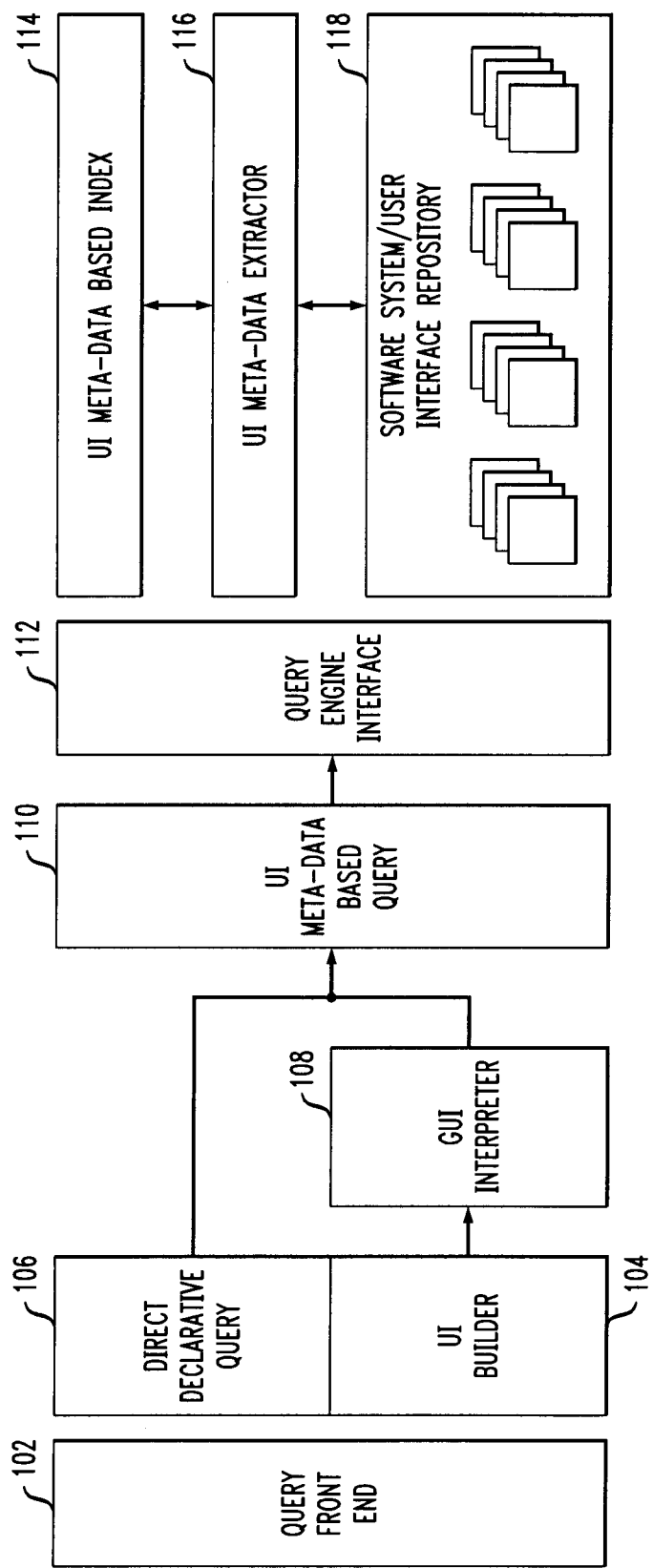
FIG. 1 is a diagram illustrating components used in the techniques described herein, according to an embodiment of the present invention.

FIG. 1 is a diagram illustrating components used in the techniques described herein, according to an embodiment of the present invention. By way of illustration, FIG. 1 depicts a query front end module 102, a UI builder module 104, a direct declarative query module 106, a graphical user interface (GUI) interpreter module 108 and a UI meta-data based query module 110. FIG. 1 also depicts a query engine interface module 112, along with a UI meta-data based index module 114, a UI meta-data extractor module 116 and a system/UI interface repository module 118.

Existing user interfaces are stored in the system/UI interface repository module 118. UI meta-data extractor module 116 extracts the meta-data of the user interface in the repository and the UI meta-data based index module 114 indexes the existing user interfaces based on the meta-data extracted.

The end-user that requires a particular user interface can describe the user interface using a graphical editor (for example, component 104 in FIG. 1). The graphical editor provides a palate include all user interface elements along with properties specification editor (for layout, style properties, etc. to be specified). The user interface thus created is interpreted by a GUI interpreter module 108, which extracts the meta-data. The data is then passed to a UI meta-data based query module 110, which constructs the meta-data based query and invokes the query engine interface module 112 to search for related user interfaces. Suitable matches of user interfaces based, for example, on their rankings, can then be returned back to the end-user.

User interface elements have various properties to capture or characterize them. By way of example, these properties can be characterized as basic, style and behavioral properties. Basic properties are properties that define what the user interface element is. For example, for a text box, type (to determine it is text box), width, height, password (true if takes in a password field) are basic properties. Style properties define the look and feel of the user interface element. For example, color, font size, back ground color, border style, etc. are style properties. Behavioral properties define the behavior of the user interface element in terms of the possible events/user interactions allowed on it. For example, behavioral properties can include whether a user interface element can be clickable or not, and if clickable, how it behaves; whether a UI element invokes a client side script or invokes a back end service call, etc.

These groups of properties constitute the meta-data of a given user interface element. For a given page (user interface), there can also be extra information captured along with the meta-data of the user interface elements in it. For example, at a page (user interface) level, the overall structure or layout of the user interface element is a noted attribute. The following high level structural elements, as described herein, can be used for any user interface.

Additionally, content properties are the properties that represent the type of content being displayed in a user interface based on the semantics. For instance, examples can include all labels with the text "Name," or all drop-downs which allow selection of a country. One or more embodiments of the invention also include blocks (fragments) and containers. Each page can be considered to be split into blocks such as, for example, header, footer, content area, navigation panel, etc. Each block can directly contain the user interface elements or can further contain structural elements called containers. Containers include various types such as, for example, list container, news paper container, data layout container, etc. Each container can include either containers or user interface elements.

The property set of basic, style and behavioral also applies to containers. Given these structural elements and user interface elements, the meta-data at the page (user interface) level can be captured as a nested-graph of such elements. At a top level, the meta-data for the page (user interface) can be a graph where each node is a block. The edges between these blocks have an edge property, which captures the distance, position (left, right, up, down, etc.) of each block with respect to each other and the overall page width and height. Each node (block) in the page graph can have block-sub-graph associated therewith, where each node can be either user interface elements or containers. The edge property can again be applied here to the edges between the nodes, which captures the distance, position (left, right, up, down, etc.) of each node (user interface element or container) with respect to each other and the overall block width and height. If the block sub-graph contains any container nodes, each container node can have a container-sub-graph associated therewith it, where each node can be either containers or user interface elements.

The meta-data of the page can include a set of graphs and sub-graphs with properties (basic, style and behavioral) at each node and properties (distance, position) at the edge. For a given page, the meta-data can be, for example, a graph of user interface elements, or a nested graph of containers and user interface elements or a nested graph of blocks, containers and user interface elements. The repository can be populated with this meta-data information by parsing available user interfaces.

Figure 2:
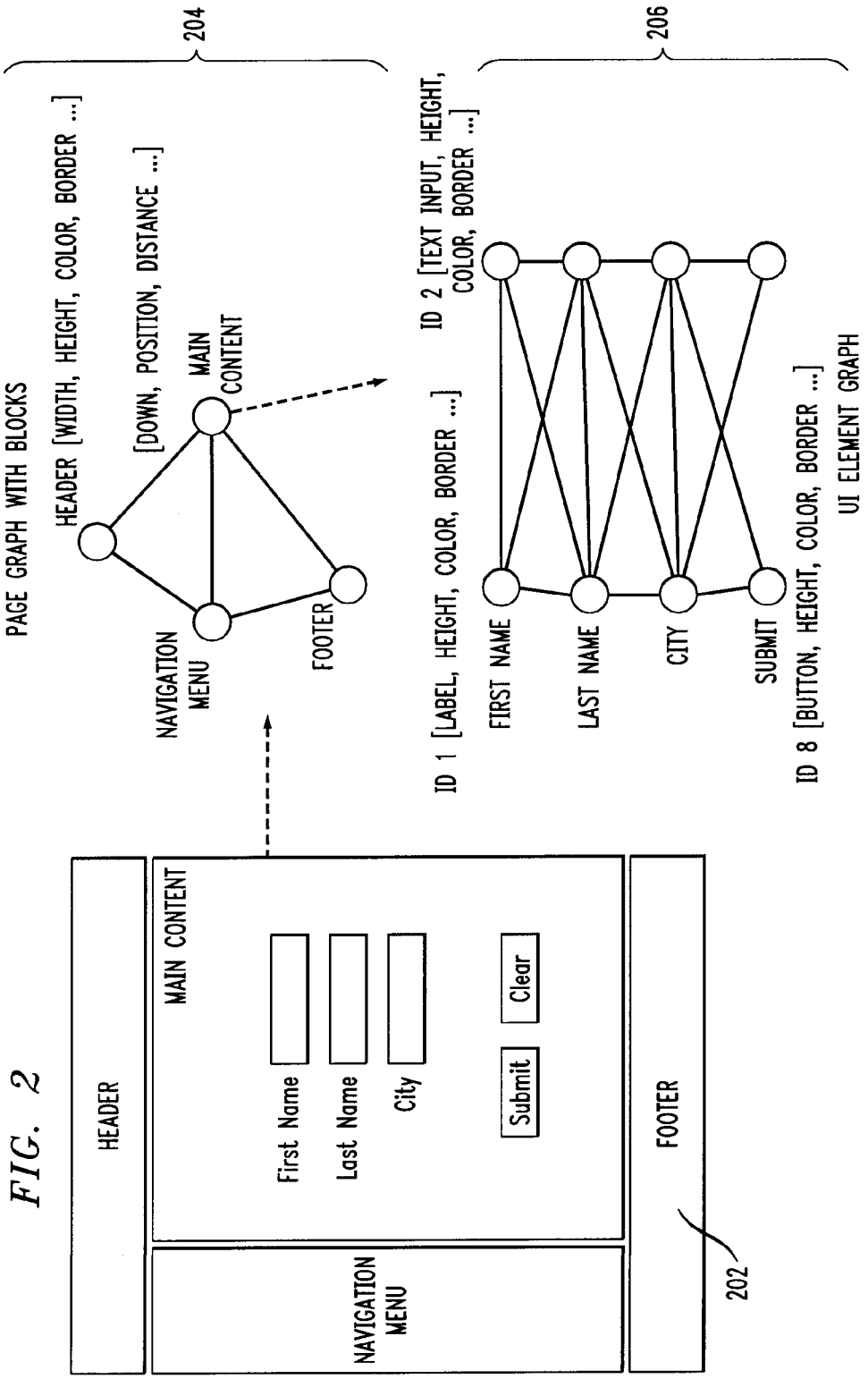
FIG. 2 is a diagram illustrating a graphical representation of the meta-data for a particular page, according to an embodiment of the present invention.

FIG. 2 is a diagram illustrating a graphical representation of the meta-data for a particular page, according to an embodiment of the present invention. By way of illustration, FIG. 2 depicts a sample user interface 202, and page graphs (with blocks) 204 and a UI element graph 206. Given a user interface 202, the corresponding meta-data that is extracted is a set of graphs. The top level page graph 204 depicts the components that depict the UI. The nodes of this graph can be blocks like header, footer, navigation area, content area, etc. Each high level block can in-turn include UI elements and the detailed UI element graph 206 captures the layout and details of the UI interface elements within a particular block. There can various properties (basic, style and behavior) that are associated with each node and edge in the graphs.

As detailed herein, one or more embodiments of the invention include a search query for searching the meta-data. By way of example, a user can describe the desired user interface using the graphical editor. The UI could be detailed completely (high-fidelity) or it can be just a rough sketch (low-fidelity). Additionally, one or more embodiments of the invention can follow the same meta-data extraction principle explained above to extract the meta-data for the desired UI. This meta-data (graph with sub-graphs) of desired UI becomes a search query. This query can then be searched against the set of meta-data of available UI stored in a repository. Further, the searching can reduce to a graph (sub-graph) matching problem.

The graph property of the desired UI can be identified as to whether it is block, container or UI element level, and based on it, compared against the corresponding level of the meta-data graph available in the repository. The matches that are found can be ranked based on the degree of match. The degree of match can be determined, for example, by the extent up-to which the properties of the graph match with each other. In one or more embodiments of the invention, once the list of matches is available, the UI pages are returned with the portion of the desired UI highlighted therein.

Figure 3:
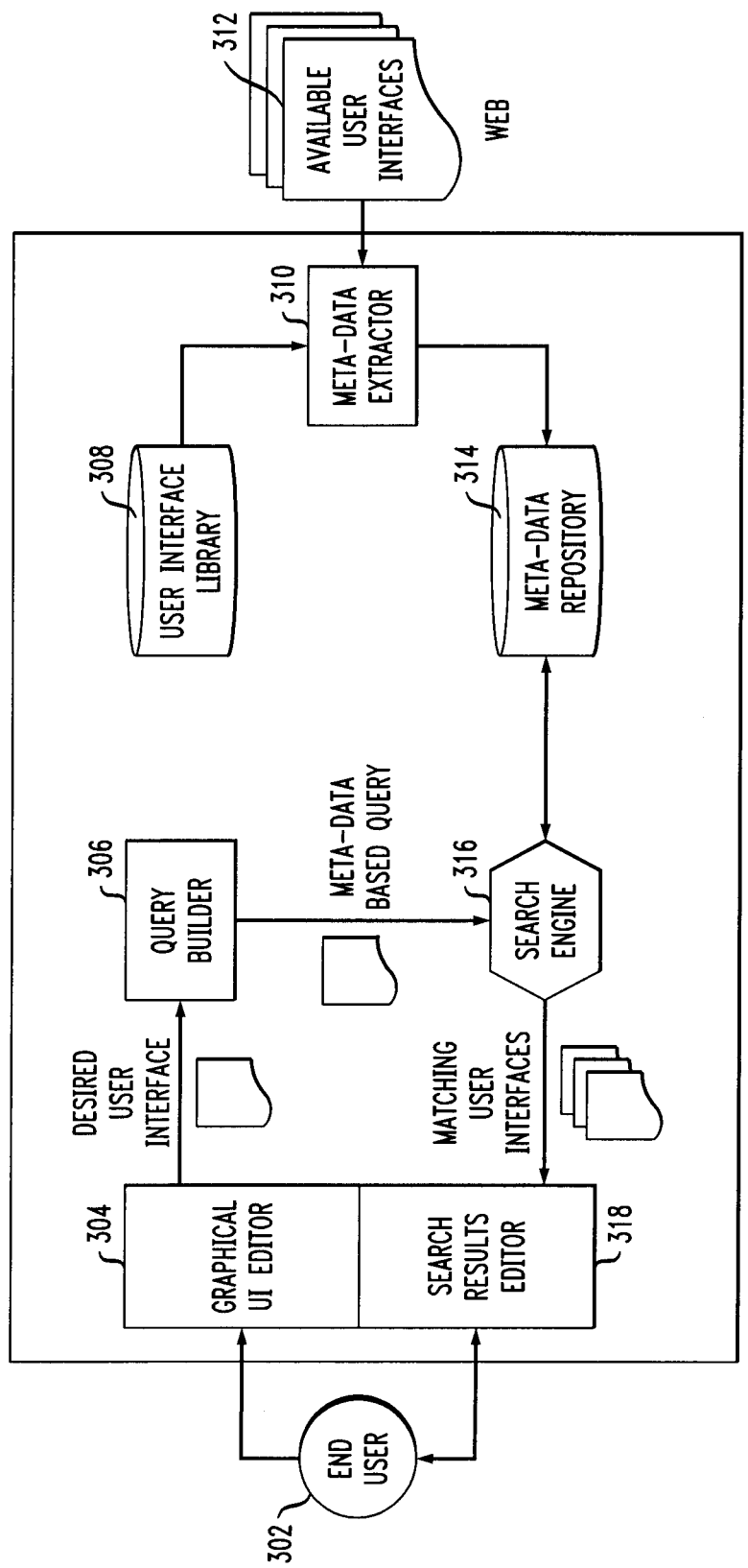
FIG. 3 is a diagram illustrating searching for a desired user interface, according to an embodiment of the present invention.

FIG. 3 is a diagram illustrating searching for a desired user interface, according to an embodiment of the present invention. By way of illustration, FIG. 3 depicts an end user 302, a graphical UI editor module 304, a query builder module 306, a user interface library module 308, a meta-data extractor module 310, available user interfaces 312, a meta-data repository module 314, a search engine module 316 and a search results editor module 318.

As depicted in FIG. 3, an end user 302 uses the graphical UI editor 304 to create the desired user interface. The desired user interface is then taken by the query builder module 306 and a meta-data based query is constructed for the desired UI. Search engine module 316 takes this meta-data based query and searches it against the metadata repository 314 of available user interfaces. Based on the degree of matching of the meta-data, the search engine 316 can prepare a ranked list of the search results of the matching user interfaces. The search engine 316 also adds in meta-information to mark the sub-set of the matched user interface in the user interfaces in the result.

The search engine can also send these results to the search result editor module 318, which can show the list of matching user interfaces, complete, for example, with the matched portion highlighted. The list of matching interfaces can contain interfaces from various different repositories based on different technologies. The end user 302 can view the available user interfaces and view their source (for example, hypertext markup language (html), language specific code, etc.) content and re-use them.

As also depicted in FIG. 3, the meta-data extractor module 310 crawls through the available list of user interface 312 (for example, on the web) and extracts the meta-data for these user interfaces. The crawler can also extract user interfaces from existing code repositories of libraries (for example, user interface library module 308) which contain the language specific user interface implementations. The meta-data extractor module 310 can store these meta-data into the meta-data repository 314, as well as create and index these based on certain meta-data properties such as whether the meta-data is for page, block, container or user interface element level, etc. Additionally, the meta-data extractor can be fed a set of user interfaces offline, which it can parse to extract the meta-data. These offline user interfaces can be available, for example, in the user interface library 308.

One or more embodiments of the invention can also be used, for example, to create a searchable repository for common UI patterns. As such, UI designers/developers can search based on low fidelity design mockups to get the corresponding high fidelity implementation code. Also, the techniques detailed herein can be used to build a catalog of reusable UI components in various UI implementation tools.

FIG. 4 is a flow diagram illustrating techniques for searching for a user interface (UI), according to an embodiment of the present invention. Step 402 includes receiving a desired user interface as a query (or, for example, a mock-up). Step 404 includes determining meta-data for the desired user interface, wherein determining the meta-data for the desired user interface comprises converting the desired user interface query to a meta-data query (for example, via a UI query translator).

Step 406 includes using the meta-data query to search for the desired user interface, wherein searching for the desired user interface comprises querying meta-data of one or more existing user interfaces and selecting one or more similar user interfaces. Designing the desired user interface can include using the meta-data query to construct the desired user interface using a graphical user interface editor.

The techniques depicted in FIG. 4 can also include forming an index by indexing meta-data attributes of existing user interfaces (for example, using a UI index engine) based on searchable meta-data. One or more embodiments of the invention can additionally include indexing existing user interfaces based on one or more qualitative descriptions (for example, specifications). Querying meta-data of existing user interfaces and selecting similar user interfaces can include, for example, using the index to query for a user interface based on the determined and/or required metadata of the desired user interface.

One or more embodiments of the invention can also include using the index to create a searchable repository of common user interface patterns. Additionally, the techniques detailed herein can include searching the searchable repository of common user interface patterns based on a low fidelity design mockup to determine a corresponding high fidelity implementation code. One or more embodiments of the invention also include using the index to build a catalog of reusable user interface components in user interface implementation tools. Further, the techniques depicted in FIG. 4 can include providing a mechanism to construct the query visually.

The techniques depicted in FIG. 4 also include searching the searchable repository of common user interface patterns by specifying faulty and/or standard interface queries to enable filtering out of faulty interfaces and those that do not adhere to a set of standards, enabling testing and verification of one or more user interfaces. Additionally, UI developers can also use one or more embodiments of the invention to test and verify all developed user interfaces from a repository by providing a user interface query corresponding to a faulty interface or a standard interface and analyzing the returned interfaces. Also, in the "UI as a service" scenario, one or more embodiments of the invention enable selection of a desired interface from a set of multiple UI services available to render the same information, by specifying the desired interface in form of a metadata query, which can then be run on all the existing UI's available to return the most similar UI and appropriately select the corresponding UI service.

The techniques depicted in FIG. 4 can also, as described herein, include providing a system, wherein the system includes distinct software modules, each of the distinct software modules being embodied on a tangible computer-readable recordable storage medium. The distinct software modules can include, for example, a user interface query translator module, a user interface index engine module, a graphical user interface editor module and a meta-data extractor module executing on a hardware processor.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity). Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention.

In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in the figures and corresponding text herein. The method steps can then be carried out using the distinct software modules and/or sub-modules of the system, as described above, executing on one or more hardware processors 502. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, using meta-data of user interfaces to index the user interfaces such that similar interfaces can be searched from a large collection of existing user interfaces.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for searching for a user interface (UI), wherein the method comprises:

extracting one or more items of meta-data from multiple existing user interfaces, wherein each of said items of meta-data comprises a page graph comprising one or more nodes representing one or more attributes of the corresponding user interface;

forming a searchable index by indexing the one or more items of meta-data of the multiple existing user interfaces;

receiving a desired user interface as a query;

determining one or more items of meta-data for the desired user interface, wherein each of said items of meta-data comprises a page graph comprising one or more nodes representing one or more attributes of the desired user interface, and wherein determining the one or more items meta-data for the desired user interface comprises analyzing the desired user interface query to extract the one or more items of meta-data, and using the one or more items of meta-data to construct a meta-data query, and wherein determining meta-data for the desired user interface is carried out via a query builder module executing on a hardware processor; and using the meta-data query to search for the desired user interface, wherein searching for the desired user interface comprises searching the meta-data query against the searchable index of meta-data of the multiple existing user interfaces and selecting one or more existing user interfaces ranked based on a degree of matching of the page graph corresponding to the desired user interface to one or more page graphs corresponding to one or more of the multiple existing user interfaces in the index, and wherein using the meta-data query to search for the desired user interface is carried out via a search engine module executing on a hardware processor.

2. The method of claim 1, further comprising indexing one or more existing user interfaces based on one or more qualitative descriptions.

3. The method of claim 1, wherein querying meta-data of one or more existing user interfaces and selecting one or more similar user interfaces comprises using the index to query for a user interface based on the determined metadata of the desired user interface.

4. The method of claim 1, further comprising using the index to create a searchable repository of common user interface patterns.

5. The method of claim 4, further comprising searching the searchable repository of common user interface patterns based on a low fidelity design mockup to determine a corresponding high fidelity implementation code.

6. The method of claim 4, further comprising searching the searchable repository of common user interface patterns by specifying at least one of faulty and standard interface queries to enable filtering out of faulty interfaces and those that do not adhere to a set of standards, enabling testing and verification of one or more user interfaces.

7. The method of claim 1, further comprising using the index to build a catalog of one or more reusable user interface components in one or more user interface implementation tools.

8. The method of claim 1, further comprising providing a mechanism to construct the query visually, wherein constructing the query visually comprises using the meta-data query to construct the desired user interface using a graphical user interface editor.

9. The method of claim 1, further comprising providing a system, wherein the system comprises one or more distinct software modules, each of the one or more distinct software modules being embodied on a tangible computer-readable recordable storage medium, and wherein the one or more distinct software modules comprise a user interface query translator module, a user interface index engine module, a graphical user interface editor module and a meta-data extractor module executing on a hardware processor.

10. A computer program product comprising a tangible computer readable recordable storage medium including computer useable program code for searching for a user interface (UI), the computer program product including:

computer useable program code for extracting one or more items of meta-data from multiple existing user interfaces, wherein each of said items of meta-data comprises a page graph comprising one or more nodes representing one or more attributes of the corresponding user interface;

computer useable program code for forming a searchable index by indexing the one or more items of meta-data of the multiple existing user interfaces;

computer useable program code for receiving a desired user interface as a query;

computer useable program code for determining one or more items of meta-data for the desired user interface, wherein each of said items of meta-data comprises a page graph comprising one or more nodes representing one or more attributes of the desired user interface, and wherein determining the one or more items meta-data for the desired user interface comprises analyzing the desired user interface query to extract the one or more items of meta-data, and using the one or more items of meta-data to construct a meta-data query; and computer useable program code for using the meta-data query to search for the desired user interface, wherein searching for the desired user interface comprises searching the meta-data query against the searchable index of meta-data of the multiple existing user interfaces and selecting one or more existing user interfaces ranked based on a degree of matching of the page graph corresponding to the desired user interface to one or more page graphs corresponding to one or more of the multiple existing user interfaces in the index.

11. The computer program product of claim 10, wherein the computer useable program code for querying meta-data of one or more existing user interfaces and selecting one or more similar user interfaces comprises computer useable program code for using the index to query for a user interface based on the determined metadata of the desired user interface.

12. The computer program product of claim 10, further comprising computer useable program code for using the index to create a searchable repository of common user interface patterns.

13. The computer program product of claim 10, wherein the computer useable program code comprises one or more distinct software modules, and wherein the one or more distinct software modules comprise a user interface query translator module, a user interface index engine module, a graphical user interface editor module and a meta-data extractor module executing on a hardware processor.

14. A system for searching for a user interface (UI), comprising:

a memory; and at least one processor coupled to the memory and operative to:

extract one or more items of meta-data from multiple existing user interfaces, wherein each of said items of meta-data comprises a page graph comprising one or more nodes representing one or more attributes of the corresponding user interface;

form a searchable index by indexing the one or more items of meta-data of the multiple existing user interfaces;

receive a desired user interface as a query;

determine one or more items of meta-data for the desired user interface, wherein each of said items of meta-data comprises a page graph comprising one or more nodes representing one or more attributes of the desired user interface, and wherein determining the one or more items meta-data for the desired user interface comprises analyzing the desired user interface query to extract the one or more items of meta-data, and using the one or more items of meta-data to construct a meta-data query; and use the meta-data query to search for the desired user interface, wherein searching for the desired user interface comprises searching the meta-data query against the searchable index of meta-data of the multiple existing user interfaces and selecting one or more existing user interfaces ranked based on a degree of matching of the page graph corresponding to the desired user interface to one or more page graphs corresponding to one or more of the multiple existing user interfaces in the index.

15. The system of claim 14, wherein the at least one processor coupled to the memory operative to query meta-data of one or more existing user interfaces and selecting one or more similar user interfaces is further operative to use the index to query for a user interface based on the determined metadata of the desired user interface.

16. The system of claim 14, wherein the at least one processor coupled to the memory is further operative to use the index to create a searchable repository of common user interface patterns.

17. The system of claim 14, further comprising a tangible computer-readable recordable storage medium having one or more distinct software modules embodied thereon, wherein the one or more distinct software modules comprise a user interface query translator module, a user interface index engine module, a graphical user interface editor module and a meta-data extractor module executing on a hardware processor.

* * * * *